Sept. 22, 1964                H. A. HOUGHTON                3,150,215
           METHOD OF PRODUCING ACOUSTIC TILE FROM REDWOOD BARK
                     FIBRE AND PRODUCT OBTAINED
Filed March 30, 1959                                  4 Sheets-Sheet 2
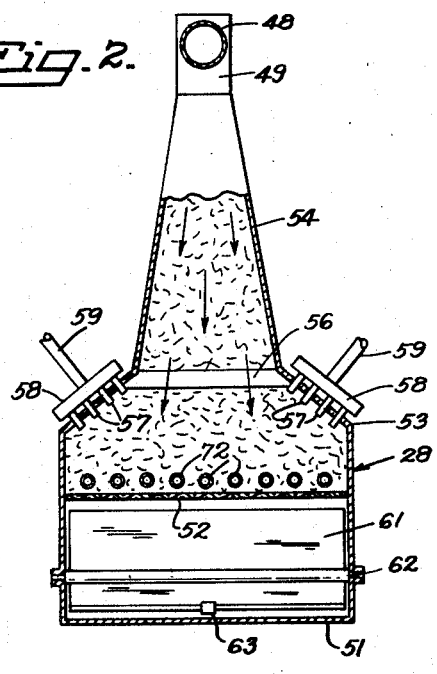
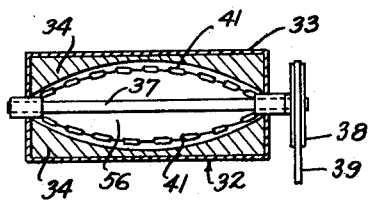
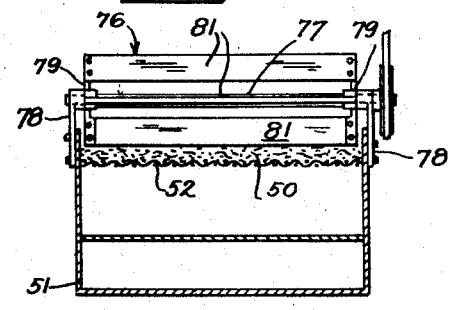
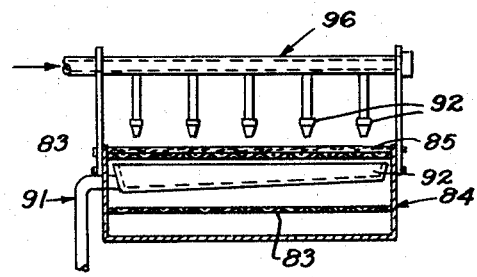
INVENTOR.
HENRY A. HOUGHTON
BY
Townsend, Townsend and Hoppe
ATTORNEYS

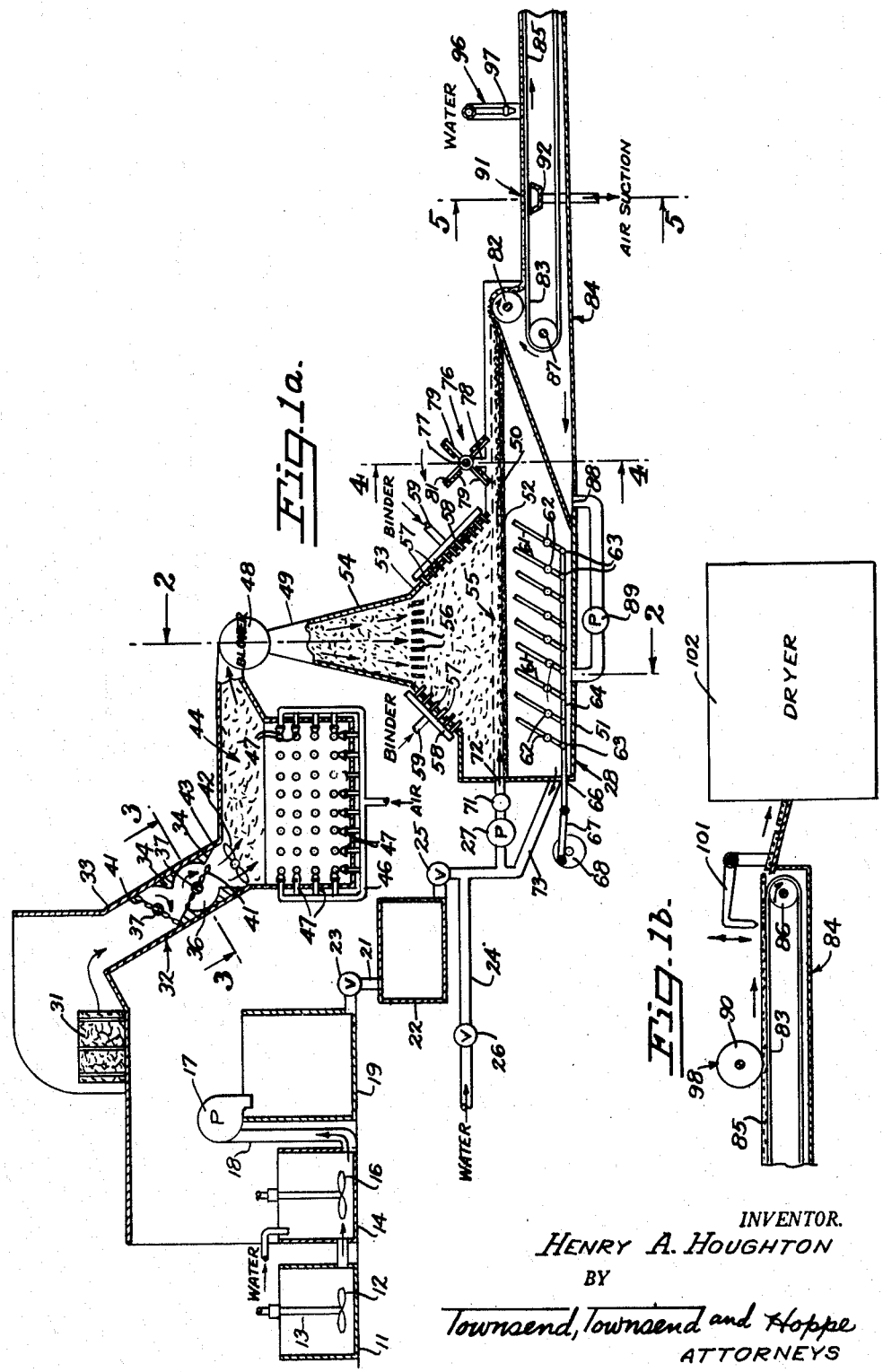

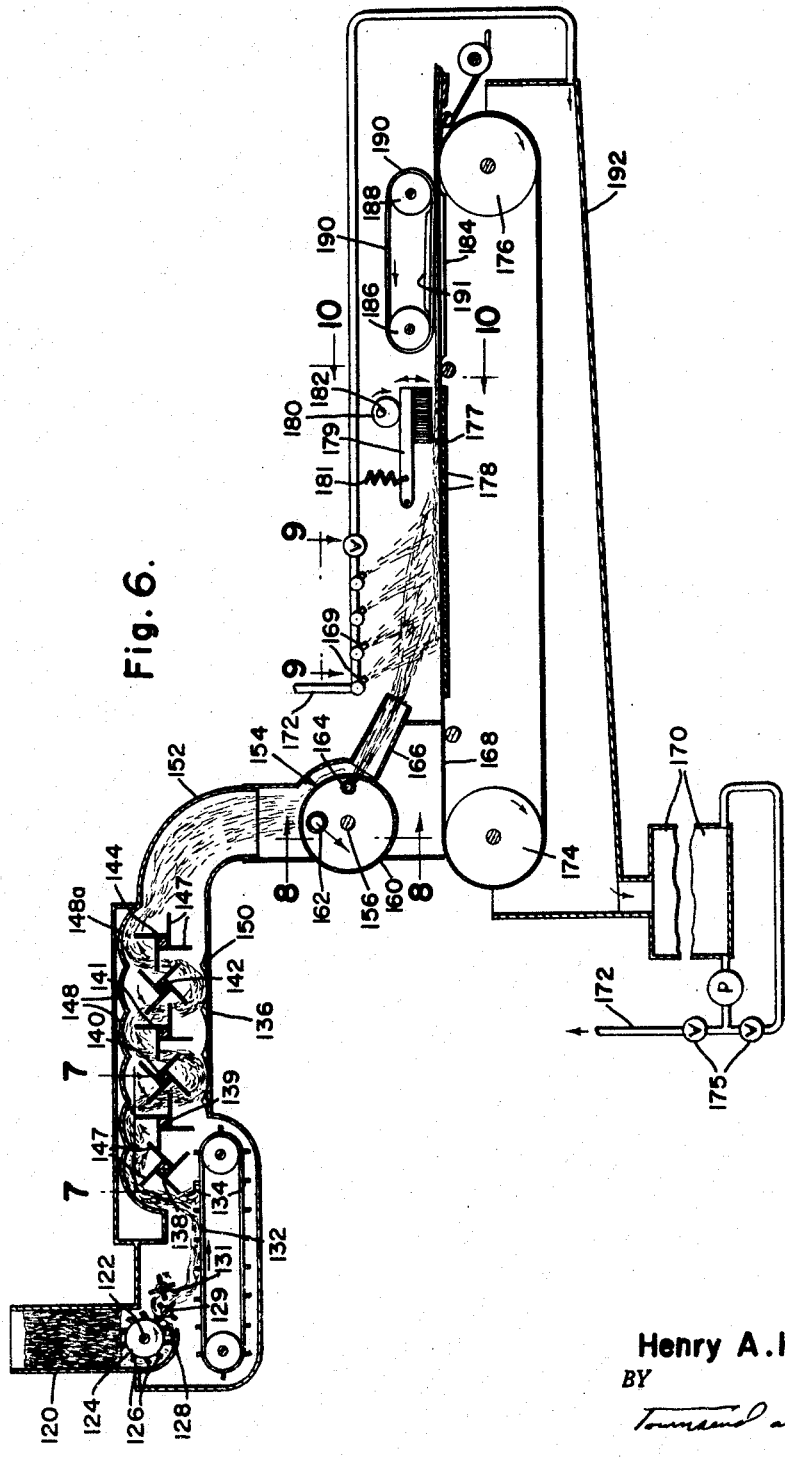

Sept. 22, 1964                H. A. HOUGHTON                3,150,215
     METHOD OF PRODUCING ACOUSTIC TILE FROM REDWOOD BARK
                   FIBRE AND PRODUCT OBTAINED
Filed March 30, 1959                              4 Sheets-Sheet 4

*INVENTOR.*
Henry A. Houghton
BY
*Townsend and Townsend*
  *attorneys*

3,150,215
METHOD OF PRODUCING ACOUSTIC TILE FROM REDWOOD BARK FIBRE AND PRODUCT OBTAINED
Henry A. Houghton, Willits, Calif., assignor to Willits Redwood Products Company, Willits, Calif., a corporation of California
Filed Mar. 30, 1959, Ser. No. 803,047
32 Claims. (Cl. 264—115)

This invention relates to an acoustic tile and method and apparatus for producing same, and is a continuation-in-part of my patent application entitled "Method of Producing Acoustic Tile from Redwood Bark Fibre and Product Obtained," Serial No. 548,418, filed November 22, 1955, now abandoned. The invention relates to the art of producing a low density tile which has exceedingly good qualities desirable in the production of building materials particularly designed to dampen sound vibration. The invention relates particularly to the production of a unique tile made from redwood bark fibre, which is largely a waste product in the lumbering operations employing California redwood, known as *Sequoia sempervirens.*

In accordance with the present invention an improved acoustical tile is formed from redwood bark fibres which are processed in a dry state up to the felting stage. At this time the fibres are first wetted in a charged atmosphere and deposited into a moving liquid stream, or according to a modification the wetted fibres are deposited onto a moving conveyor, which stream or conveyor then carries the fibres to a board making machine. The dry processing of the fibres to the point of felting maintains the natural characteristics of the fibres, facilitates processing and minimizes balling or bundling to provide a macroscopic porous tile.

An object of this invention is to produce an improved tile having acoustic qualities not heretofore available in the building industry. Additionally, an object is to provide an improved tile material of exceedingly low density and high structural strength. Another object is to provide an acoustical tile adapted to adsorb sound and which is formed from redwood bark fibre and binder and wherein the inherent cellular structure and spiral configuration of the fibre is maintained during the course of manufacture.

It is noted that redwood bark fibre is characterized as cellular in structure. It comprises substantially hollow sclerenchyma cells which act as an extremely efficient absorber. Further, the fibre is spiral corkscrew in configuration and when the fibres are loosely compacted, the effect is to produce a mass having high sound-absorbing values.

Another object of the invention is to provide an acoustic tile of the character mentioned which may be easily worked to produce any desired finish, shape or means of fixing the same to a structural support. Another object is to provide an attractive wallboard having acoustic insulating properties desirable in many building structures, such as hotels, apartment houses, restaurants, homes, factories, and the like.

An object of the invention is to produce a method and apparatus for making acoustic tile formed of redwood bark fibre with a minimum of washing or compacting of the fibre to thus maintain the inherently high sound absorption characteristics of the fibre.

Further objects of the invention are to provide a method of producing an acoustic tile of the type mentioned which does not mangle or distort the fibres from their natural or corkscrew state, and without employment of high pressures or mutilation of cellular fibre structure. Further, the method herein described avoids saturation of the fibres thereby. Another object is to provide tile of the character mentioned which is resistant to fire. Redwood bark fibre contains phenolic acid which is responsible for its natural fire resistance.

In addition, the hereinafter described method comprises wetting of the bark fibres with the binder fluid and subsequent drying. As the fibres dry, they tend to curl and deform, thus providing even lower density material than would otherwise be the case. As hereinafter set forth in greater detail, the method further contemplates handling the wetted fibres in such manner that they are not compacted and accordingly the natural light, porous nature of the fibres is maintained and enhanced.

The fibres of redwood bark in natural state are hollow and in the course of preparation of the fibres in accordance with this invention, the cavities are opened. Thus the hollow redwood fibres are superior to solid mineral or vegetable fibres used in other acoustic tiles by reason of their light weight, by reason of the sound absorption qualities of the cavities, and by reason of the arrangement of the fibres according to the invention.

Another advantage of the present invention is the fact that redwood fibres are rich in phenolic acid which is fire-retardant. The binder materials employed are primarily starch and clay, which are also fire-retardants. Hence one of the features of the present invention is the fact that the completed tile is resistant to fire.

The tile formed in accordance with this invention possesses considerable structural strength and is resistant to breaking, crushing and chipping. The bark fibres in natural state have considerable structural strength by reason of the stresses to which they are subjected during the long growth life of the tree. The structural strength of the fibres is not materially impaired by the practice of the present invention and in fact, when the fibres are cross-laced, an improvement in natural strength is obtained.

Among the problems in handling redwood fibres are the bundling of the fibres, which, unless overcome, would result in a dense and hence undesirable material and the presence of dust, which occurs naturally between the fibres. The bundling problem is handled by separating the bark first into clumps and then into the smallest possible fibre units, all in accordance with the practice of the invention, as hereinafter set forth. The problem of dust is overcome by spraying jets of binder fluid into the bark while it is suspended in an air stream, thereby binding the dust to the fibres.

Another object of the present invention is to produce a tile having a surface with macroscopic pores rendering unnecessary mechanical drilling which detracts from the appearance of the end product.

Other objects of the present invention will become apparent upon reading the following specification and referring to the accompanying drawings in which similar characters of reference represent corresponding parts in each of the several views.

In the drawings:

FIG. 1a is a schematic longitudinal sectional view through a portion of the apparatus which may be employed to practice the invention;

FIG. 1b is a continuation of the structure of FIG. 1a;

FIG. 2 is a transverse vertical sectional view through the slurry tank taken substantially along the line 2—2 of FIG. 1a;

FIG. 3 is a fragmentary transverse sectional view through the chain flail extension along the line 3—3 of FIG. 1a;

FIG. 4 is a transverse vertical sectional view through the skimming paddle and associated mechanism taken substantially along the line 4—4 of FIG. 1a;

FIG. 5 is a transverse sectional view through the board-making portion of the machine taken substantially along the line 5—5 of FIG. 1a;

FIG. 6 is a longitudinal sectional view showing a modification of the embodiment of FIGS. 1-5;

Figure 7:
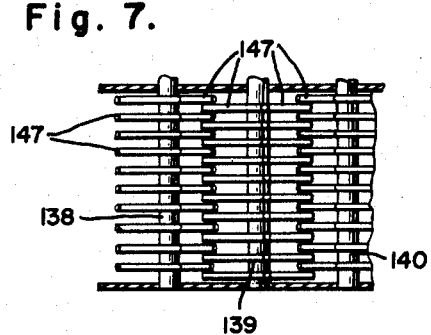
FIG. 7 is a fragmentary view of the flails taken substantially on line 7—7 of FIG. 6.
Figure 7A:
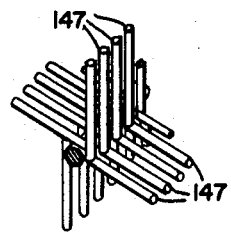
FIG. 7a is a fragmentary perspective of one of the flails.

The essence of the invention is the production of an improved acoustical tile having extremely low density and high structural strength. The results obtained are largely because of the employment of redwood bark fibres which are a unique form of building material in tile form. The fibers are released from clusters or groups as they appear in natural bark state and emerge as resilient corkscrew lengths of separated individual fibres or clusters. The resilience of the entwined corkscrew fibres enhances the strength of the end product and enables production of an improved sound insulating board.

The tile produced by the method here contemplated has density range, expressed in weight-volume relationship, of between 3 to 3.5 grams per cubic inch. This low density, high strength board produced from redwood bark fibres is made possible by the production method and apparatus which will hereafter be described.

The apparatus and method of the present invention produce a lightweight acoustical tile having voids throughout. Accordingly the apparatus and method have as their primary functions to hold the redwood fibres together, but to so handle the fibres that they are not compacted, and hence the presence of voids is enhanced.

The binder material is mixed together, preferably by mixing the dry ingredients in a mixing bin 11 having an impeller 12 driven by shaft 13 from a suitable source of power (not shown). The dry ingredients are approximately equal portions by weight of starch and clay. The starch may be corn starch and the clay may be bond or ball clay. Additives may be added, such as latex, to increase bending strength and flexibility, flameproofing salts, fungicide pellets and wax emulsion to reduce hygroscopic action in the finished tile.

The dry ingredients are added to water in mixing tank 14 where they are mixed thoroughly with water by means of agitating paddle 16 which surges the binder upward from the bottom of the tank. Approximately 12 pounds water are added to one pound starch and one pound clay. From the mixing tank 14 the liquid binder is pumped by means of pump 17 through conduit 18 into binder storage tank 19 which is of a sufficient capacity to handle the normal production of the apparatus. As required, liquid binder is withdrawn from the storage tank 19 through conduit 21 into measuring tank 22, valve 23 governing the flow. The measuring tank 22 has for its function maintaining the proper quantity flow of binder into the subsequent apparatus proportioned to the amount of bark being processed. From the measuring tank 22 the binder is mixed with additional water entering through pipe 24 and controlled by valve 26, the flow of binder being controlled by valve 25 and then pumped by means of turbine pump 27 into slurry tank 28, the details of the construction of which are hereinafter set forth.

Meanwhile the redwood bark, which may be received from a lumber mill or other source in bales 31, is passed through a chain flail 32 which comprises a conduit 33 rectangular in cross-section and having a plurality of contouring inserts 34 which constrict the interior of the conduit into a plurality of flailing chambers 36 having the shapes shown in FIGS. 1 and 3. The baled bark has been subjected to prior cleaning action to eliminate foreign matter therefrom. Each flailing chamber 36 has an elongated axis concentric with axle 37 which is driven by means of pulley 38 and belt 39 from a motor (not shown). A plurality of heavy link chains 41 extend from end to end of the flailing chamber and are attached for rotation with the axle 37. There are two axles 37 and two sets of chains 41 so located that as the chains revolve, the lumps of bark fibre are broken up by the interaction of the rotating chains. Fan 42 at the lower end of chute 43 draws the fibres out of the chain flail and into turbulent chamber 44. In the turbulent chamber 44 jets of air are introduced through the sides, ends and bottom by means of pipes 46 terminating in nozzles 47 and supplied with air from a source (not shown). The cross currents of air flowing through the nozzles 47 separate the bark fibres into individual fibres and small clusters to create a light mass which is drawn out of the turbulent chamber 44 by means of blower 48 and directed by means of air conduit 49 into canopy 54 above slurry tank 28.

The slurry tank 28 comprises a rectangular boxlike casing 51 having a longitudinally extending stationary horizontal screen 52 spaced upwardly from the bottom. Screen 52 serves as a lateral guide for the slurry 50 formed thereon and retards sinking of the heavier elements. A truncated pyramid shaped canopy 53 is placed above casing 51 adjacent the intake end of the tank merging into a superimposed truncated conical canopy 54 which receives the discharge from the conduit 49. A plurality of louvers 56 is positioned extending transversely at the juncture of the conical and pyramid canopies 54 and 53, respectively, the louvers 56 functioning to direct bark fibre evenly the length of the pyramid shaped canopy 53.

A plurality of jets 57 are located in the walls of the pyramid shaped canopy 53, each of the jets being connected to a manifold 58 which receives binder fluid through pipes 59 from measuring tank 22 by means of a conduit (not shown). Thus in the canopies 53 and 54 the bark fibre is wetted with binder fluid, but not saturated. The weight of the fluid causes the bark fibres to fall downwardly out of the air stream created by blower 48 onto the binder disposed above the level of the screen 52.

Below screen 52 is a plurality of agitating paddles 61 which extend transversely of tank 28 and function to cause an upward pulsation of binder fluid which fills the bottom of casing 51. The pulsation of binder fluid buoys up and agitates the fibre on screen 52 and also keeps the binder mixed before it picks up fibre. A preferred means for actuating such paddles 61 is shown in FIGS. 1a and 2 wherein each such paddle is mounted on a transversely extending horizontal shaft 62 positioned approximately one-third of the distance from the bottom of the paddle. The lower ends of the paddles 61 are connected by pivotal connections 63 to horizontally extending actuating rod 64 which extends out through one end of the slurry tank casing 51 through gland 66. The outer end of the actuating rod 64 is connected pivotally to connecting rod 67 which is attached to crank wheel 68. Thus as wheel 68 revolves (being driven by conventional means not shown), the paddles 61 are moved in synchronism in oscillatory movements about shafts 62.

Binder fluid is pumped by means of turbine pump 27 into horizontally disposed manifold 71 extending transversely at the rear end of casing 51 of slurry tank 28. Manifold 71 is located at the elevation of the liquid binder level 55 and feeds a plurality of ports 72 located approximately at the upper surface of screen 52, thereby moving the slurry 50 longitudinally of the screen. Pump 27 draws binder fluid not only from measuring tank 22, but also from the bottom of casing 51 by means of pipe 73. The combination of the binder fluid which contacts the bark fibres by injection through jets 57, by upward pulsation through screen 52 and by introduction through ports 72, covers the outer fibre surface with binder, and does not necessarily saturate the same, thereby reducing the amount of drying subsequently required. Further, the natural curl and resiliency of the fibres are not destroyed by saturation. The bark fibres are loosely mixed with the binder above the screen 52 in the form of a slurry 50. The term "slurry" as used herein means a mixture of binder and fibres, but is not intended to connote that the fibres are saturated. Rather, the slurry comprises a moist mat of fibre and binder.

Beyond the canopy 53 and extending transversely of the slurry tank is a skimming paddle 76 which comprises a transversely extending shaft 77 horizontally mounted by means of supports 78 and having radially extending arms 79 carrying transverse paddles extending the entire width of the screen 52. The outer edges of the paddles 81 are located barely to clear the upper surface of the screen 52. Thus, as the skimming paddle 76 revolves at a speed of approximately 60 r.p.m., it serves to press the slurry 50 formed on the upper surface of the screen 52 ahead uniformly and levelly toward the front end of the tank.

When the slurry 50 reaches the forward end of the slurry tank 28, it is engaged by spreading roll 82 which is a transversely extending cylinder having a roughened, resilient surface which picks up the slurry and carries it around and then uniformly deposits it without unnecessary compacting on the upper surface of moving screen 82 of boardmaking machine 84, moving screen 83 being located at a lower elevation than screen 52. Moving screen 83 is a continuous long wire mesh belt driven at its forward end by pulley 86 and supported at its rearward end by pulley 87. The moving screen 83 supports the mat 85 which is the residue of slurry 50 and as the mat moves forwardly, it drains through the screen 83 and is drawn off through a drain 88 and recirculated by pump 89 to slurry tank 28.

To augment the effect of gravity, one or more suction troughs 91 may be disposed below the path of the upper stretch of screen 83. Such suction troughs comprise transversely horizontally extending rubber manifolds 92 which are connected to a vacuum pump (not shown). Means not illustrated herein but well-known in the art are provided to separate the entrapped liquid from the air stream and recirculate the same to the slurry tank 28.

To enhance the acoustic properties of the final product it is desirable to provide a plurality of small, binder-free orifices or micro-pores in the mat 85. These orifices may be formed by the action of heads 96 which extend transversely above the surface of screen 83 at one or more locations and have a plurality of depending hydraulic jets 97 which emit fine streams of water at approximately two-inch intervals, thereby opening a series of small, binder-free orifices in the mat 85.

Beyond the heads 96 may be stationed a fissuring device 98 such as roll 99 to cause irregular fissures to appear on the upper portion of the mat, thereby augmenting the sound absorption properties and improving the appearance of the finished tile. The construction of such fissuring device 98 is no part of the present invention and is well understood in the art to which this invention pertains.

Adjacent the forward end of the moving screen 83 is a mechanically actuated cutoff knife 101 which cuts the mat 85 into squares or panels of desired shape and size. The squares are then received in a dryer 102 where they are subjected to a temperature of approximately 400 to 450° F. for approximately four and one-half hours in order to remove the moisture from the binder and from the bark fibres.

After having been dried the squares may be subjected to further processing, as well understood in this art and by equipment which is not illustrated herein. For the sake of completeness, such subsequent processing may be described as sanding, sawing into squares, a second sanding operation to reduce the tiles to the required thickness, a subsequent sawing operation to trim the ends to proper size, and edging, if required. Subsequently the tiles may be painted, if desired.

FIGS. 6–10 illustrate a preferred embodiment of the invention. In the modification the bale is broken up, flailed into individual fibres, and in an aerially-suspended state wetted with a binder. In this embodiment the moving medium comprises a conveyor belt rather than a moving liquid stream.

The dry redwood bark fibre in bale form is introduced to the apparatus through a dry feed chute 120 where it may be urged downwardly to assist gravity by suitable pressure such as a hydraulic press (not illustrated). Chute 120 is arcuate at its bottom and carries a transversely disposed axle 122 on which a bale breaker drum 124 carrying teeth 126 slanted counterclockwise, as viewed in FIG. 6, removes fibres from the bale and delivers the fibre through opening 128 in chute 120 to the primary breakdown flails 129 and 131.

The primary breakdown flails comprise a pair of toothed shafts 129 and 131 journaled for intermeshing rotation of the teeth immediately forward (or to the right in FIG. 6) of drum 124. A source of power not illustrated rotates the first toothed shaft 129 clockwise (FIG. 6) at about 1750 r.p.m. and the second toothed shaft counterclockwise at about 3500 r.p.m. slightly above and ahead of the first shaft. Flail 129 removes the mat of fibre from drum 124 and the primary breakdown flails 129 and 131 together subject the fibre to a plucking action, partially fluffing and separating it.

The primary breakdown flails deliver the plucked fibres to a primary conveyor 132 which has been illustrated as including a plurality of transversely disposed ridges 134 to facilitate movement of the redwood fibres. Conveyor 132 then delivers the fibres to flailing assembly 136 where the fibres are simultaneously flailed into substantially discrete fibres and aerated.

The flailing assembly has been illustrated as a housing 136 containing six intermeshing flails 138, 139, 140, 141, 142 and 144 respectively.

FIG. 7 fragmentarily illustrates the construction and intermeshing of the flails. The flails consists of transversely disposed drive shafts each of which carries a plurality of bars 147 disposed at 90° intervals about the drive shaft. As appears in FIG. 7 the arcuately or 90° spaced bars each consist of a row of individual bars or teeth. Power means, not illustrated, operates each drive shaft whereby (as indicated by the arrows in FIG. 6) flails 138, 139, 141 and 144 rotate clockwise and flails 140 and 142 operate counterclockwise. The first two flails (138 and 139) rotate clockwise (as viewed in FIG. 6) to create an initial air stream pumping the fibre forwardly to successive flails and preventing the fibre from being blown backward to clog conveyor 132.

Bars 147 on successive flails are transversely staggered to intermesh upon rotation. A clearance of approximately ⅛ inch between intermeshing, rotating bars and a relatively fast rate of rotation, substantially 1750 r.p.m. for individual flails has been found satisfactory.

Housing 136 is provided with the plurality of arcuate baffles 148 and 150 at its top and bottom which outline the arcuate periphery of the individual rotating flails whereby fibres passing through flailing assembly 136 necessarily encounter the action of the flails, assuring thorough breaking and shearing. It will be observed the last top baffle 148ª over the last flail 144 terminates arcuately lower than preceding baffles or at a point about ¼ of the way down from the maximum height of the baffle. This develops directional flow of the fibres into the suspended fibre duct 152.

The fluffed and separated fibres are exhausted from flailing assembly 136 by air currents created by the flails into duct 152 which carries the fibres forwardly and downwardly to a skeletal cylinder or squirrel cage 154.

Figure 8:
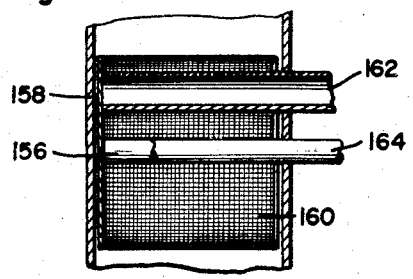
FIG. 8 is a view taken substantially on line 8—8 of FIG. 6.
Figure 9:
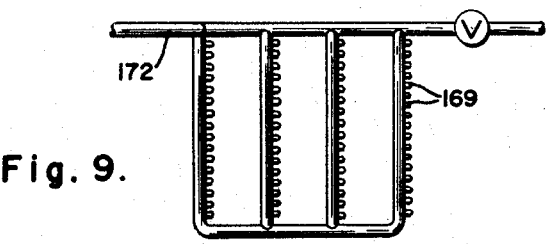
FIG. 9 is a view taken substantially on line 9—9 of FIG. 6.

The construction of the cylinder as illustrated in FIG. 8 includes a drive shaft 156 on one end of which is mounted a plate 158 which peripherally supports a course mesh screen 160. The drive shaft is connected with power apparatus, not illustrated, which rotates the cylinder in a clockwise direction as viewed in FIG. 6 at about 64 r.p.m.

Entering the open end, or end to the right as viewed in FIG. 8, is an air suction unit 162 and an air manifold or blowing unit 164. Suction unit 162 is located at the 12:00 o'clock position of the rotating mesh 160 as viewed in FIG. 6 to initially attract and adhere by suction the fibres received from air duct 152 onto the surface of screen 156 and also to remove dust. The screen then rotates 90° to a 3:00 o'clock position, as viewed in FIG. 6, where blower 164 exhausts the fibres through a trough or chute 166 into a temporary aerial suspension over conveyor 168. Duct 166 is positioned to control the path of air and suspended fibres to a confluence with wet binder liquid sprayed from jets 169. Jets 169 are connected with a binder supply tank 170 through line 172. Valves 175 permit selective regulation of the pressure of the sprays through jets 169.

Conveyor 168 is foraminous and preferably is a moving screen supported by rollers 174 and 176, at least one of which is carried by a power-actuated drive shaft to cause the conveyor to travel in a clockwise direction as viewed in FIG. 6.

Fibres exhausted from chute 166 are wetted exteriorly by binder from jets 169 and the pressure of the spray deposits or felts them on moving conveyor 168 to form a continuous mat on the moving screen or conveyor 168.

A base plate 177 preferably apertured as at 178 to permit passage of excess binder, supports the conveyor at this point and horizontally forward past the sprays or jets 169 to an agitating leveller in the form of a series of wire brushes 179 adapted to agitate and level the mat.

Figure 10:
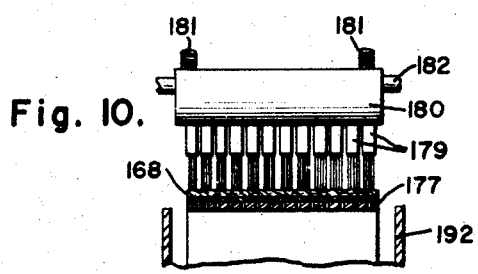
FIG. 10 is a view taken substantially on line 10—10 of FIG. 6.

As appears in FIG. 10 the brushes are a series of transversely disposed wire brushes mounted over the conveyor. Suitable means such as springs 181, normally urge the brushes upwardly and a cam 180 carried by the rotating drive shaft 182 oscillates the brushes downwardly to level and smooth the mat. The brushes also agitate the mat and subject the fibres to a knitting action and without subjecting the collected fibres to excessive compaction. Means, not illustrated, are provided for raising or lowering drive shaft 182 to vary and selectively determine the depth of the stroke of the brushes. The brushes should oscillate rapidly at about 700 to 800 strokes per minutes. The contact face of the brushes is set slightly at an angle downwardly causing an increasing pressure on the mat as it proceeds beneath the brushes. The contact faces should be adjusted so the forward or lowest point on the face is approximately ⅛ inch lower than the top of the mat at the bottom of the stroke. This causes individual wires to penetrate the surface of the mat on the down stroke causing a levelling and knitting action upon the fibres.

The conveyor next takes the mat between a plate 184 and a press consisting of two rollers 186 and 188, one of which is mounted on a drive shaft to move canvas belt 190 carried by the rollers counterclockwise. As viewed in FIG. 6 roller 188 is mounted slightly lower than 186 to increase pressure progressively as the conveyor carries the mat under the belt 190. Means, not illustrated, are provided to raise and lower the press and an adjustable pressure plate 191 provides pressure on the canvas. The pressure applied is moderate to avoid excessive compaction and should be adjusted to cause only about a 10 percent increase in the density of the mat.

The foregoing described elements are mounted in a shell 192 which captures excess binder dropped from conveyor 168 and channels it back to the supply tank for re-use.

Having passed under belt 190 the mat is then conveyed to a conventional oven, not illustrated, where it is subjected to approximately 400° temperature for from 4 to 8 hours as required by the particular oven.

As a result of the minimum or exterior wetting of individual fibres according to the present invention an acoustic tile is provided as the end product which is characterized by intertwined redwood fibres retaining their natural, spiral, hollow characteristic defining an acoustic tile of macroscopic, sound-absorbing pores and having a density of about 9.6 pounds per cubic foot.

The product may be generally characterized as sound absorbing, light weight, resistant to swelling and disintegration by water and to ignition by flame.

The material is air porous but not water porous. Multitudes of minute pores characterize the product.

The terms "acoustic tile" or "acoustic board," as used herein and in the claims, means and is intended to include not only tile having a primary purpose for sound control but also covers other forms of tile and board including insulating board, and other panel boards.

Although the foregoing invention has been described in some detail by way of illustration and examples for purposes of clarity of understanding, it is understood that certain changes and modifications may be practiced within the spiirt of the invention and scope of the appended claims.

What is claimed:

1. A method of preparing board from redwood bark fibres wherein the fibres are maintained in a dry state prior to felting comprising: providing a piece of redwood bark, separating individual dry fibres from the bark; moving the dry fibres through an air stream to suspend the fibres; depositing binder fluid on the outer surface of the fibres while moving suspended through the air stream; collecting the fibres as they fall out of the air stream in order to felt the same; maintaining said felted fibres in a relatively uncompacted state by agitation thereof during felting; and forming board from the fibres.

2. A method of preparing board from redwood bark fibres wherein the fibres are maintained in a dry state prior to felting comprising: flailing the dry fibres to separate the same; blowing the fibres into an air stream; wetting the outside of the fibres with binder fluid while being blown to cause separation of the wetted fibres from the air stream; felting the wetted fibres; agitating the felted fibres to level the same while preventing excessive compaction thereof; and forming board from said felted fibres.

3. A method of preparing board from redwood bark fibres wherein the fibres are maintained in a dry state prior to felting comprising: providing a piece of redwood bark; separating the piece into individual fibres; blowing the fibres; wetting the outside of the fibres with binder fluid while being blown to cause separation of the wetted fibres from the air stream; felting the wetted fibres on a moving medium to form a mat thereon; agitating the mat to level the same while preventing excessive compaction; pressing the mat after agitating to increase its density about 10 percent; and forming board from the mat.

4. A method of preparing board from redwood bark wherein the fibres are maintained in a dry state prior to felting comprising: flailing the bark into substantially individual fibres while in a dry state; blowing the dry fibres to separate the same into small units; wetting the outside of the fibres with binder fluid while being blown to cause separation of the wetted fibres from the air stream; felting the wetted fibres on a moving medium to form a mat thereon; agitating the mat to level the same while preventing excessive compaction and while moving it horizontally; and forming board therefrom.

5. A method of preparing acoustic material from redwood bark fibres wherein the fibres are maintained in a dry state prior to felting comprising: blowing the dry fibres to separate the same; wetting the outside of the fibres with binder fluid while being blown to cause separation of the wetted fibres from the air stream; felting the wetted fibres on a moving medium to form a mat thereon; pulsating the mat during felting to prevent excessive compaction while moving it horizontally; draining excess binder fluid from said mat; and drying the mat to form acoustic board.

6. A method of producing acoustic tile from redwood bark fibres comprising: providing a piece of redwood bark; separating from the piece individual said fibres while dry; wetting said fibres with a liquid binder; depositing said wetted fibres on a moving medium to form a mat thereon; agitating said mat to prevent undue compaction; pressing said mat after agitating to increase the density thereof not in excess of 10 percent; and conveying said fibres to a board-making machine.

7. Apparatus for preparing acoustic mats of redwood bark comprising: means for preparing an adhesive binder fluid; means for separating bark fibres into substantially separate fibres; means to aerially suspend said fibres; means for spraying binder fluid on said fibres while suspended; a moving medium positioned to receive suspended fibres thereon; means for agitating fibres received upon said moving medium to prevent excessive compaction; vertically adjustable pressure means positioned over said moving medium; and associated board-making means positioned to receive material discharged from said moving medium.

8. Apparatus for forming acoustic tile from redwood bark fibres including a casing; conveyor means positioned interiorly of said casing; means for blowing fibres over said conveyor means; means for spraying liquid binder over said conveyor means; agitating means associated with said conveyor means to agitate and prevent undue compaction of fibres deposited on said last-named means while said fibres are being conveyed; and press means positioned over said conveyor means and vertically adjustable thereabove.

9. A method of producing acoustic tile from redwood bark fibres and binder material comprising: separating said bark fibres; forming a moving stream of liquid binder moving in a preselected linear direction; depositing said fibres on said moving stream of binder; and moving said fibre and binder to a board-making machine while maintaining the fibres at a level adjacent the liquid level of said moving stream.

10. A method of producing acoustic tile from redwood bark fibres and binder material comprising: separating said bark fibres; forming a moving stream of liquid binder; wetting the exterior of said fibres; depositing the wetted fibres on said moving stream of binder; causing said binder to pulsate upwardly during deposit of said fibres thereupon; and moving said fibres and binder to a board-making machine while maintaining the fibres at a level adjacent the liquid level of said moving stream.

11. A method of producing acoustic tile from redwood bark fibres and binder material comprising: separating said bark fibres; forming a moving stream of liquid binder; wetting the exterior of said fibres; depositing the wetted fibres on said moving stream of binder; and moving said fibres and binder to a board-making machine while maintaining the fibres at a level adjacent the liquid level of said moving stream.

12. A method of preparing acoustic tile from redwood bark fibres and binder material comprising: separating said fibres; passing said fibres through an atmosphere charged with liquid binder material; depositing said fibres on a moving stream of binder; and moving said fibres and binder to a board-making machine while maintaining the fibres at a level adjacent the fluid level of said moving stream.

13. A method of preparing acoustic material from redwood bark comprising: separating the bark fibres; moving the bark fibres through an air stream; depositing binder fluid on the outer surface of the fibres while moving through the air stream; forming a pool of binder below said air stream; collecting the fibres as they fall out of said air stream in the form of a slurry of fibres and binder; maintaining the slurry in uncompacted state; and forming acoustic board from said slurry.

14. A method of preparing acoustic material from redwood bark fibres and binder material comprising: blowing the bark fibres to separate the same; wetting the outside of the fibres with binder fluid while being blown to cause separation of the wetted fibres from the air stream; collecting the wetted fibres in a slurry; pulsating the slurry while moving the slurry horizontally to maintain the slurrry uncompacted; and forming acoustic board from the slurry.

15. A method of preparing acoustic material from redwood bark fibres and binder material comprising: directing opposed streams of air into the bark fibres to separate the same into small units; wetting the outside of the fibres with binder fluid while being blown to cause separation of the wetted fibres from the air stream; collecting the wetted fibres in a slurrry; pulsating the slurry while moving the slurrry horizontally to maintain the slurry uncompacted; and forming acoustic board from said slurry.

16. A method of preparing acoustic material from redwood bark and binder material comprising: flailing the bark; blowing the flailed bark; directing opposed streams of air into the bark fibres while being blown to separate the same into small units; wetting the outside of the fibres with binder fluid while being blown to cause separation of the wetted fibres from the air stream; collecting the wetted fibres in a slurry; pulsating the slurry while moving the slurry horizontally to maintain the slurry uncompacted; and forming acoustic board from said slurry.

17. A method of preparing acoustic material from redwood bark fibres and binder material comprising: blowing bark fibres to separate the same; wetting the outside of the fibres with binder fluid while being blown to cause separation of the wetted fibres from the air stream; collecting the wetted fibres in a slurrry; pulsating the slurry while moving the slurry horizontally to maintain the slurry uncompacted; draining excess binder fluid from said slurry to form a mat; forming small holes in said mat; and drying said mat to form acoustic board.

18. Apparatus for preparing acoustic mats of redwood bark comprising: means for preparing an adhesive binder fluid; means for separating bark fibre into undivided fibre units; a tank containing liquid binder material; a screen positioned in said tank below the liquid level of said binder; means to wet exteriorly said fibres; means to deposit the wetted fibres on top of the binder material in said tank; means for moving a slurry of fibres and binder fluid longitudinally of said screen; and board-making means positioned to receive said slurry discharged from one end of said screen.

19. Means for preparing acoustic mats of redwood bark comprising: means for preparing an adhesive binder fluid; means for separating bark fibre into separate fibres; a tank to contain liquid binder material; a screen positioned in said tank proximate and below the liquid level of said binder; means for creating pulsation of fluid in said tank upwardly through said screen; means for moving material above said screen longitudinally thereof; and board-making means positioned to receive said slurry discharged from one end of said screen.

20. Apparatus for preparing acoustic mats of redwood bark comprising: means for preparing an adhesive binder fluid; means for separating bark fibre into separate units; means for suspending said fibres in an air stream; means for spraying binder fluid on said fibres while suspended; a tank to contain liquid binder; a screen in said tank positioned proximate and below the liquid level of said binder; a plurality of agitating paddles in said tank below said screen; means for actuating said paddles to create pulsation of fluid in said tank upwardly through said screen; means for moving material above said screen longitudinally thereof; and board-making means positioned to receive said slurry discharged from one end of said screen.

21. Apparatus for preparing acoustic mats of redwood bark comprising: means for preparing an adhesive binder liquid; means for separating bark fibre into separate units; means for suspending said fibre in an air stream; means for spraying binder fluid on said fibre while suspended; a tank to contain liquid binder; a screen in said tank positioned proximate and below the liquid level of said binder; a plurality of agitating paddles in said tank below said screen; means for actuating said paddles to create pulsation of fluid in said tank upwardly through said screen; means for flowing binder fluid substantially parallel to said screen along the upper surface thereof; and board-making means positioned to receive said material discharged from one end of said screen.

22. Apparatus for preparing acoustic mats of redwood bark comprising: means for preparing an adhesive binder fluid; means for separating bark fibre into separate units; means for suspending said fibre in an air stream; means for spraying binder liquid on said fibre while suspended; a screen positioned proximate and below the liquid level of said binder; a tank to contain liquid binder in which said screen is positioned; a plurality of agitating paddles in said tank below said screen; means for actuating said paddles to create pulsation of fluid in said tank upwardly through said screen; means for flowing binder liquid substantially parallel to said screen along the upper surface thereof; a skimming paddle above said screen arranged to move material along said screen parallel and above said screen; and board-making means positioned to receive said fibre and binder discharged from one end of said screen.

23. Apparatus for preparing acoustic mats of redwood bark comprising: means for preparing an adhesive binder liquid; means for separating bark fibre into separate units; means for suspending said fibres in an air stream; means for spraying binder liquid on said fibres while suspended; a tank for liquid binder; a screen positioned in said tank proximate and below the liquid level of binder in said tank; means for depositing fibres in said tank above said screen; means for moving a slurry of fibres and binder longitudinally and above said screen; a spreading roll to discharge material from one end of said screen; and board-making means positioned to receive material discharged by said spreading roll.

24. A slurry tank comprising: a slurry impervious casing; a screen fixedly mounted substantially horizontally in said casing; a canopy above said casing adjacent one end thereof; means for blowing fibres into said canopy; means in said canopy for spraying liquid binder material interiorly thereof; and means for intermittently moving fibres along the upper surface of said screen.

25. A slurry tank comprising: a casing; a screen mounted substantially horizontally in said casing; a canopy above said casing adjacent one end thereof; means for blowing fibres into said canopy; means in said canopy for spraying liquid binder material interiorly thereof; pulsating means in said casing below said screen to create pulsation in fluid upwardly through said screen; and means for moving said fibres along the upper surface of said screen.

26. A slurry tank comprising: a casing; a screen mounted substantially horizontally in said casing; a canopy above said casing adjacent one end thereof; means for blowing fibres into said canopy; means in said canopy for spraying liquid binder material interiorly thereof; agitating paddles in said casing below said screen; means for actuating said agitating paddles to create upward pulsation of fluid through said screen; and means for moving material along the upper surface of said screen.

27. A slurry tank comprising: a casing; a screen mounted substantially horizontally in said casing; a canopy above said casing adjacen one end thereof; means for for blowing fibres into said canopy; means in said canopy for spraying liquid binder material interiorly thereof; and means for introducing liquid into said casing above said screen in a directon substantially parallel to said screen to move the material above said screen in a predetermined direction.

28. A slurry tank comprising: a casing; a screen mounted substantially horizontally in said casing; a canopy above said casing adjacent one end thereof; means for blowing fibres into said canopy; means in said canopy for spraying liquid binder material interiorly thereof to contact said fibres; means for introducing liquid binder under pressure into said casing above said screen in a direction substantially parallel to said screen to move the material above said screen in a predetermined direction; and a skimming paddle positioned above said screen adjacent the end thereof opposite said means for introducing liquid into said casing to move material above said screen substantially longitudinally thereof.

29. A slurry tank comprising: a casing; a screen mounted substantially horizontally in said casing; a canopy above said casing adjacent one end thereof; means for blowing fibres into said canopy; means in said canopy for spraying liquid binder material interiorly thereof; agitating means below said screen to create an upward surge of liquid in said casing through said screen; and means for actuating said agitating means.

30. A slurry tank comprising: a casing; a screen mounted substantially horizontally in said casing; a canopy above said casing adjacent one end thereof; means for blowing fibres into said canopy; means in said canopy for spraying liquid binder material interiorly thereof; means for introducing fluid into said casing above said screen in a direction substantially parallel to said screen to move the fluid on said screen in one direction; and a spreading roller adjacent one end of said screen to receive material from the surface of said screen and discharge said material from said slurry tank.

31. Apparatus for preparing acoustic mats of redwood bark comprising: means for preparing an adhesive binder fluid; means for separating bark fibres into substantially separate fibres; means for aerially suspending said fibres; means for spraying binder fluid on said fibres while suspended; a moving medium positioned to receive suspended fibres thereon; means for agitating fibres received on said moving medium during felting to prevent excessive compaction, said agitating means including wire brush means and means to oscillate said brush means vertically relative said fibres carried by said moving medium; and associated board-making means positioned to receive material discharged from said moving medium.

32. Apparatus according to claim 31 and wherein means is provided over said moving medium to compress said fibres to increase the density thereof, said last means comprising means associated with said moving medium to exert pressure upon said fibres over a substantial stretch of said moving medium.

References Cited in the file of this patent
UNITED STATES PATENTS

| | | |
|---|---|---|
| 342,991 | Allen | June 1, 1886 |
| 910,358 | Chapman | Jan. 19, 1909 |
| 1,056,915 | Lappen | Mar. 25, 1913 |
| 1,182,697 | Margolius | May 9, 1916 |
| 1,349,112 | Weiss | Aug. 10, 1920 |
| 1,468,036 | Shaw | Sept. 18, 1923 |
| 1,489,567 | Weiss | Apr. 8, 1924 |

(Other references on following page)

UNITED STATES PATENTS

| | | |
|---|---|---|
| 1,712,852 | Streeter | May 14, 1929 |
| 1,828,029 | Marx et al. | Oct. 20, 1931 |
| 1,846,406 | Sweeney | Feb. 23, 1932 |
| 1,931,570 | Brown et al. | Oct. 24, 1933 |
| 1,979,864 | Carson | Nov. 6, 1934 |
| 2,045,096 | Osborne | June 23, 1936 |
| 2,065,395 | Richter | Dec. 22, 1936 |
| 2,076,991 | Holgersson | Apr. 13, 1937 |
| 2,331,145 | Slayter | Oct. 5, 1943 |
| 2,488,700 | Bidwell | Nov. 21, 1949 |
| 2,493,194 | Heino | Jan. 3, 1950 |
| 2,696,147 | Christy | Dec. 7, 1954 |
| 2,699,709 | Breuning et al. | Jan. 18, 1955 |
| 2,711,381 | Novotny et al. | June 21, 1955 |
| 2,787,572 | Schwartz | Apr. 2, 1957 |
| 2,822,028 | Himmelheber et al. | Feb. 4, 1958 |
| 2,897,874 | Stalego | Aug. 4, 1959 |